(12) United States Patent
Jongbloed et al.

(10) Patent No.: US 12,479,168 B2
(45) Date of Patent: Nov. 25, 2025

(54) ROUNDED SONOTRODE

(71) Applicant: Technische Universiteit Delft, Delft (NL)

(72) Inventors: Bram Cornelius Petrus Jongbloed, Delft (NL); Irene Fernandez Villegas, Delft (NL); Julie Jan Edouard Teuwen, Delft (NL)

(73) Assignee: Technische Universiteit Delft, Delft (NL)

( * ) Notice: Subject to any disclaimer, the term of this patent is extended or adjusted under 35 U.S.C. 154(b) by 163 days.

(21) Appl. No.: 18/002,390

(22) PCT Filed: Jun. 23, 2021

(86) PCT No.: PCT/NL2021/050397
§ 371 (c)(1),
(2) Date: Dec. 19, 2022

(87) PCT Pub. No.: WO2021/262001
PCT Pub. Date: Dec. 30, 2021

(65) Prior Publication Data
US 2023/0226775 A1     Jul. 20, 2023

(30) Foreign Application Priority Data
Jun. 24, 2020 (NL) ........................ 2025908

(51) Int. Cl.
*B29C 65/00* (2006.01)
(52) U.S. Cl.
CPC ...... *B29C 66/81422* (2013.01); *B29C 66/342* (2013.01); *B29C 66/73921* (2013.01); *B29C 66/8122* (2013.01)
(58) Field of Classification Search
CPC ............ B29C 66/81422; B29C 66/342; B29C 66/73921; B29C 66/8122; B29C 65/08
See application file for complete search history.

(56) References Cited

U.S. PATENT DOCUMENTS 6,511,563 B2 * 1/2003 Roylance .......... B29C 66/73921
156/580.2
7,896,994 B2    3/2011 Soccard
(Continued)

FOREIGN PATENT DOCUMENTS

| JP | 2005224966 A | 8/2005 |
|---|---|---|
| JP | 2010284860 A | 12/2010 |

(Continued)

OTHER PUBLICATIONS

Definition of Scallop from https://www.merriam-webster.com/dictionary/scallop. Downloaded Sep. 6, 2024, 11:08 Pm ET (Year: 2024).*

(Continued)

*Primary Examiner* — George R Koch
(74) *Attorney, Agent, or Firm* — Smith Baluch LLP

(57) ABSTRACT

The invention provides a sonotrode (100) for welding a material, the sonotrode (100) comprising a welding section (110) configured for contacting the material, wherein the welding section (110) defines a rounded shape (111) in a cross-section parallel to a longitudinal axis (A) of the sonotrode (100), wherein the rounded shape (111) approximates a circular sector (20), wherein the circular sector (20) has a central angle $\alpha_c$ selected from the range of 25°-300°, and wherein the circular sector (20) has a central radius $r_c$ selected from the range of 5-30 mm, and wherein the sonotrode (100) has a width W perpendicular to the longitudinal axis (A) [and to the cross-section], wherein W is selected from the range of 10-100 mm.

22 Claims, 5 Drawing Sheets

(56) References Cited

U.S. PATENT DOCUMENTS

| | | | | |
|---|---|---|---|---|
| 2008/0210360 A1* | 9/2008 | Soccard | ............ | B29C 66/81469 |
| | | | | 156/73.4 |
| 2008/0314498 A1* | 12/2008 | Lee | ................... | B29C 66/73941 |
| | | | | 156/64 |
| 2014/0290873 A1 | 10/2014 | Altieri, Jr. | | |
| 2015/0210002 A1* | 7/2015 | Short | .................... | H01P 11/007 |
| | | | | 156/580.2 |
| 2015/0290873 A1* | 10/2015 | Hull | ........................ | B29C 66/43 |
| | | | | 156/580.2 |

FOREIGN PATENT DOCUMENTS

| | | | |
|---|---|---|---|
| JP | 2012066546 A | * | 4/2012 |
| JP | 2015116602 A | | 6/2015 |

OTHER PUBLICATIONS

International Search Report and Written Opinion in International Application No. PCT/NL2021/050397, mailed Sep. 21, 2021, 8 pages.

* cited by examiner

ROUNDED SONOTRODE

CROSS-REFERENCE TO RELATED APPLICATIONS

This application is a U.S. national-stage application, under 35 U.S.C. 371, of International Application No. PCT/NL2021/050397, filed Jun. 23, 2021, which claims the priority benefit of Netherlands Application No. 2025908, filed Jun. 24, 2020. Each of these applications is incorporated herein by reference in its entirety for all purposes.

FIELD OF THE INVENTION

The invention relates to a sonotrode for welding a material. The invention further relates to a method for welding a material. The invention further relates to a use of the sonotrode.

BACKGROUND OF THE INVENTION

Sonotrodes are known in the art. For instance, US2015290873 describes a specially designed sonotrode and anvil adapted to be used in combination for ultrasonic welding of work pieces. The contact surfaces comprise a surface of the anvil having a plurality of energy directors, where the plurality of energy directors are arranged into a three-dimensional grid pattern to be capable of distributed vibration-transmissive contact. The energy directors may comprise a series of plateau surfaces being regularly spaced apart from each other in a first direction, and in a second direction that is orthogonal to the first direction, to form the grid pattern. The rectangular-shaped plateaus may be spaced apart by valleys. Engagement of the energy directors of the anvil with the corresponding surface of the sonotrode may cause minor elastic deformation of work pieces positioned therebetween prior to ultrasonic welding.

JP2012066546A describes a method of producing a fusion material of a thermoplastic liquid crystal polymer film fused by using ultrasonic waves. The method includes: a step of laminating a thermoplastic liquid polymer film and an adherend with the thermoplastic liquid crystal polymer up and with the adherend down; and a step of obtaining the fusion material of the thermoplastic liquid crystal polymer film by fusing the thermoplastic liquid crystal polymer film and the adherend by using the ultrasonic waves while bringing the ultrasonic horn of an ultrasonic wave fusion apparatus into direct contact with the upper side of the thermoplastic liquid crystal polymer film.

JP2010284860A describes an off-line stretching apparatus including a housing chamber and a tenter. The housing chamber houses a preceding film roll and a succeeding film roll. The tenter holds a preceding film sent out of the preceding film roll and widens the preceding film. After all preceding films are sent out, a succeeding film is sent out of the succeeding film roll to the tenter. At a joint provided before the tenter, a rear end of the preceding film and a top end of the succeeding film are superposed to provide an overlapping. The overlapping is held by a horn vibrating in a C direction and a receiving surface and welding processing is performed.

JP2015116602A describes an ultrasonic vibration bonding device with a compact configuration in which a resonator is supported by support means in a state where a central axis C is inclined with respect to a pressing direction Z so that a projection line to each sheet-like member S of the central axis C is not superimposed on a locus of a bonding portion formed on each sheet-like member S.

JP2005224966A describes a method wherein thermoplastic resin products composed of a receiving body and a plate-like body are passed while brought into contact with the leading end of an ultrasonic horn by a conveyor. In this case, the ultrasonic horn for conducting an ultrasonic vibration of 1-28 kHz is arranged over the whole width of the thermoplastic resin products.

SUMMARY OF THE INVENTION

In order to manufacture (large) multipart structures, it may be needed to join multiple parts together. For example, thermoplastic composites—which may be increasingly used in the aerospace industry—may be joined by applying heat and pressure at the location where the parts are to be joined.

One of the techniques which may be used for joining parts together is continuous ultrasonic welding. In continuous ultrasonic welding a sonotrode may exert high frequency low peak-to-peak amplitude vibrations transversely to a welding interface while applying a (constant) static pressure and moving the sonotrode along a to-be-welded seam/area (herein also: "along a welding line" or "weld line"). The vibrations may introduce surface and viscoelastic friction at the weld interface, which may heat up the welding interface, and may thereby join the two parts together.

However, prior art sonotrodes may provide excessively high interface temperatures and a larger heat-affected zone since the sonotrode covers a large portion of the to-be-welded area, which may be detrimental for weld quality of the weld and may degrade the adherends themselves. Additionally, prior art sonotrodes may excite the surroundings of the welding interface, and may thereby also heat up sections of the adherends close to the welding interface, and/or may result in through-the-thickness heating, which may be detrimental to the adherends.

Further, prior art sonotrodes may be restricted for the welding of flat panels, i.e., they are unsuitable for the welding of curved panels. The efficient welding of curved panels may, however, be important for, for example, aerospace and automotive industries.

Further, prior art sonotrodes may provide a high energy density and/or may require a high power for welding.

Yet further, it may be cumbersome to identify suitable operational parameters for welding a material with a prior art sonotrode. For example, it may require substantial effort to determine a suitable parameter set of vibrational peak-to-peak amplitude, welding force and welding speed.

In addition, prior art sonotrodes may result in a substantial level of material distortion. For example, the heating may result in one or more layers of the adherends to become molten around the edges, whereupon the molten material may be pushed outwards under the pressure of the sonotrode, i.e., due to the high temperatures the material may become viscous and can then easily flow under the static pressure of the sonotrode. For example, with regards to a material comprising resin and/or fibers, the resin and/or fibers may be squeezed out of the adherends at the edges of the welding overlap, which may cause local thickness variations and porosity.

Other prior art technologies, such as induction welding, may result in damage to the to be joined material, such as a thermoplastic composite, when a metal mesh is used on the outside for lightning strike protection of an aircraft structure, which may not be an issue for ultrasonic welding.

Hence, it is an aspect of the invention to provide an alternative sonotrode, which preferably further at least partly obviates one or more of above-described drawbacks. The present invention may have as object to overcome or ameliorate at least one of the disadvantages of the prior art, or to provide a useful alternative.

Hence, in a first aspect the invention may provide a sonotrode, especially for welding a material. The sonotrode may comprise a welding section configured for contacting the material, especially wherein the welding section defines a rounded shape in a cross-section parallel to a longitudinal axis of the sonotrode. In particular, the rounded shape may approximate a circular sector, especially wherein the circular sector has a central angle selected from the range of 25°-300°, such as from the range of 100°-300°, or such as 25°-100°. In embodiments, the circular sector may have a radius $r_c$ selected from the range of 5-30 mm. In further embodiments, the sonotrode may have a width W perpendicular to the longitudinal axis, and especially perpendicular to the cross-section, wherein W is selected from the range of 10-100 mm.

The sonotrode according to the invention may provide a rounded contact surface. Thereby, the sonotrode according to the invention may provide the benefit that heat generation may be more locally focused to the welding interface (or: "weld interface"), which may result both in lower power requirements, a lower interface temperature, and/or less heating of surrounding areas, especially "through-the-thickness" heating, and may thereby improve welding quality.

Further, the sonotrode of the invention may be particularly suitable for welding of curved materials, such as curved panels.

The rounded contact interface further enables having a relatively small contact area during operation. The small contact area may be particularly beneficial for determining a suitable set of operational parameters. In particular, a parameter may be (linearly) varied along a welding line, and, due to the small contact area, the effect of the parameter value may be directly observed at the corresponding location along the welding line.

In specific embodiments, the invention may provide a sonotrode for welding a material, the sonotrode comprising a welding section configured for contacting the material, wherein the welding section defines a rounded shape in a cross-section parallel to a longitudinal axis of the sonotrode, wherein the rounded shape approximates a circular sector, wherein the circular sector has a central angle selected from the range of 100°-300°, and wherein in specific embodiments the circular sector has a radius $r_c$ selected from the range of 5-30 mm, and wherein the sonotrode has a width W perpendicular to the longitudinal axis, wherein W is selected from the range of 10-100 mm.

In specific embodiments, the invention may provide a sonotrode for welding a material, the sonotrode comprising a welding section configured for contacting the material, wherein the welding section has a welding shape approximating a semi-cylindrical shape, wherein the semi-cylindrical shape has a cylinder height $h_c$ perpendicular to a longitudinal dimension of the sonotrode, wherein the cylinder height $h_c$ is selected from the range of 10-100 mm, and wherein the semi-cylindrical shape has a cylinder radius $r_c$ selected from the range of 5-30 mm, and especially wherein $h_c > r_c$. Hence, the radius $r_c$ of the circular sector may essentially be the same radius as the cylinder radius $r_c$.

Hence, the invention may provide a sonotrode. A sonotrode is a tool that may be functionally coupled to a piezoelectric converter, especially a stack of piezoelectric converters, that may generate ultrasonic vibrations. The sonotrode may then transfer (or "apply") the mechanical vibrations to a material, such as a liquid or a solid, especially a solid. In embodiments, the sonotrode may comprise or be functionally coupled to a booster. In particular the sonotrode may be functionally coupled to a piezoelectric converter via a booster.

The sonotrode may especially be suitable for welding a material, especially a solid material. The material may be any to be welded material. In embodiments, the material may comprise a polymer composite material. In specific embodiments, the material may comprise a thermoplastic, especially a (fiber-reinforced) thermoplastic composite. In particular, the material may comprise a thermoset (composite) with a thermoplastic coupling layer co-cured on the surface adherend, i.e., a thermoset (composite) that may be welded through a thermoplastic coupling layer. The material may also be referred to herein as an "adherend". The term "material" may herein also refer to a plurality of (different) materials.

The sonotrode of the invention may be particularly advantageous with respect to a thermoset composite due to the reduced heating caused by the sonotrode. Thermoset composites may be particularly sensitive to high temperatures, for example due to the presence of epoxy, which may degrade relatively fast under high temperatures.

Hence, the sonotrode may comprise a welding section for contacting the material. The welding section may especially be curved, i.e., not flat, more especially rounded. The welding section may be the part of the sonotrode that is configured to (directly) contact the to be welded material during use of the sonotrode.

Hence, in embodiments, the welding section may comprise a rounded welding section.

In particular, the welding section may define a rounded shape in a cross-section parallel to a longitudinal axis of the sonotrode, and especially perpendicular to the width W of the sonotrode. In embodiments, the rounded shape may approximate a circular sector. In further embodiments, the circular sector may have a central angle of at least 10°, such as at least 25°, especially at least 45°, such as at least 90°, especially at least 135°, such as at least 150°, especially at least 175°. In further embodiments, the circular sector may have a central angle of at least 30°, such as at least 35°, especially at least 40°, such as at least 60°. In further embodiments, the circular sector may have a central angle of at most 330°, such as at most 300°, especially at most 270°, such as at most 235° especially at most 210°, such as at most 190°. In further embodiments, the circular sector may have a central angle of at most 160°, such as at most 120°, especially at most 100°, such as at most 90°. Hence, the central angle may, for example, be selected from the range of 25°-300°, especially from the range of 100°-300°, such as from the range of 135°-210°, or especially from the range of 25°-100°, such as from the range of 25°-40°, or such as from the range of 40°-100°.

A small central angle, such as, for example, 10°, may be limited with regards to the benefit for the welding of curved materials. Hence, increasing the central angle from 10° may improve the sonotrode with regards to welding of curved materials.

However, a high central angle, such as 330°, may reduce the stability of the sonotrode. Hence, from 270°, reducing the central angle may provide a more robust sonotrode.

It appears particularly beneficial to have a central angle of about 180°, especially of 180°. Thereby, the sonotrode provides high flexibility with regards to the welding of a curved material without (substantially) sacrificing stability.

Further, there may be a trade-off between (conveniently) accepted curvatures of curved panels and a welding speed, particularly given a radius and width of the sonotrode. In particular, a relatively large central angle, such as a central angle selected from the range of 100°-300° may be suitable for welding curved panels with relatively large curvature. A relatively small central angle, such as a central angle selected from the range of 25°-100°, may have a relatively larger (contact surface of the) welding section, which may still be relatively small compared to the prior art, and which may facilitate faster welding. In further embodiments, for instance, the central angle may be selected from the range of 25°-40° to facilitate particularly fast welding. In yet further embodiments, for instance, the central angle may be selected from the range of 40°-100° to facilitate fast welding, while increasing the range of curvatures that may be conveniently welded.

In embodiments, the circular sector may have a radius $r_c$ selected from the range of 2.5-50 mm, such as from the range of 5-30 mm, especially from the range of 6-20 mm, such as from the range of 7-10 mm. In further embodiments, the radius may be at least 1 mm, especially at least 2 mm, such as at least 2.5 mm, especially at least 3 mm, such as at least 4 mm, especially at least 5 mm, such as at least 6 mm, especially at least 7 mm. In further embodiments, the radius may be at most 60 mm, such as at most 50 mm, especially at most 40 mm, such as at most 30 mm, especially at most 20 mm, such as at most 15 mm, especially at most 10 mm.

In embodiments, the sonotrode may have a thickness T perpendicular to the longitudinal axis A and the width W, wherein the thickness may vary along the longitudinal axis and/or the width W, especially along the longitudinal axis. In further embodiments, the thickness T may have a constant value along at least 10% of the sonotrode along the longitudinal axis, such as along at least 20%, especially along at least 30%, such as along at least 50%. In further embodiments the constant value may be equal to twice the radius $r_c$ of the circular sector.

The thickness T may especially be the thickness of a second part (see below).

Hence, in specific embodiments, the circular sector may have a central angle of (about) 180°, wherein the sonotrode may have a thickness T perpendicular to the longitudinal axis A and the width W, wherein the thickness T has a constant value along at least 10% of the sonotrode along the longitudinal axis, wherein the constant value equals twice the radius $r_c$ of the circular sector. In such embodiments, the welding section may smoothly transition into the rest of the sonotrode.

In particular, in a cross-sectional plane, at least 5%, especially at least 10%, such as at least 20% of the sonotrode along the longitudinal axis, starting from the welding section, may approximate a first shape, wherein the first shape is a composite shape defined by a circular sector and a rectangle, wherein the circular sector has a central angle of (about) 180°, and wherein a circular sector and the rectangle share a side, i.e., the straight edge of the circular sector (with a length of twice the radius $r_c$) is an edge of the rectangle.

In further embodiments, the welding section may define a rounded shape in cross-sections parallel to a longitudinal axis of the sonotrode and perpendicular to the width W of the sonotrode along at least 30% of the width W of the sonotrode, such as along at least 50% of the width of the sonotrode, especially along at least 70% of the width of the sonotrode, such as at along at least 90% of the width of the sonotrode, including along 100% of the width of the sonotrode.

In further embodiments, the welding section may have a shape approximating a cylindrical sector. The term "cylindrical sector" may herein refer to the result of two straight cuts through the central axis of a cylinder along the height of the cylinder, i.e., the section of a cylinder defined by two planes parallel to the central axis of the cylinder. The cylindrical sector may further be defined by a circular sector and a height, particularly by the radius and central angle of the circular sector and the height of the cylinder sector.

For example, if the two planes parallel to the central axis of the cylinder are parallel, the cylindrical sector is a semi-cylinder, i.e., a cylindrical sector defined by a circular sector having a central angle of 180°. Hence, in specific embodiments, the welding section may have a shape approximating a semi-cylindrical shape.

In further embodiments, the sonotrode may have a width W perpendicular to the longitudinal axis, wherein the width W is selected from the range of 5-200 mm, especially from the range of 10-100 mm, such as from the range of 15-80 mm, especially from the range of 20-60 mm. In further embodiments, the width W may be at least 5 mm, such as at least 10 mm, especially at least 15 mm, such as at least 20 mm, especially at least 30 mm. In further embodiments, the width W may be at most 200 mm, such as at most 150 mm, especially at most 100 mm, such as at most 80 mm, especially at most 70 mm, such as at most 60 mm, especially at most 50 mm, such as at most 40 mm.

The width W of the sonotrode may especially define the height of the cylindrical sector, such as the height of the semi-cylindrical shape.

The term "approximate" and its conjugations herein, such as in "to approximate a shape", refers to being nearly identical to, especially identical to, the following term, for example nearly identical to a circular sector or a semi-cylindrical shape. For example, a welding section may define a circular sector but for a defect. Similarly, for example, the rounded shape defined by the welding section may not be perfectly round but slightly ellipsoidal. In particular, an object approximating a first shape may herein refer to: a first shape realization encompassing the object, wherein the first shape realization is defined as the smallest encompassing shape of the (2D or 3D, respectively) object wherein the first shape realization has the shape of the first shape, wherein a ratio of the area (volume) of the first shape realization to the area (volume) of the object is ≤1.2, especially ≤1.1, such as ≤1.05, especially ≤1.02. For instance, a welding section may approximate a semi-cylindrical shape, wherein the first shape realization may be defined as the smallest encompassing semi-cylindrical shape of the welding section, wherein a ratio of the volume of the first shape realization to the volume of the welding section is ≤1.2, especially, especially ≤1.1, such as ≤1.05, especially ≤1.02, including 1. Further, if the dimensions of the first shape are defined, the term approximate may refer to the object and the first shape being superimposable (in 2D or 3D, respectively) such that an intersection between the object and the first shape covers at least n % of the object and at least n % of the shape, wherein n is at least 90%, such as at least 95%, especially at least 98%, such as at least 99%, including 100%.

Hence, in specific embodiments, an intersection of the rounded shape and the circular sector may cover at least n % of the rounded shape and at least n % of the circular sector, wherein n is at least 90%, such as at least 95%, especially at least 98%, such as at least 99%, including 100%.

Similarly, in embodiments, an intersection between the welding shape and the semi-cylindrical shape may cover at least n % of the shape and at least n % of the semi-cylindrical shape.

In further embodiments, in a cross-section the welding section may define an outline, wherein at least part of the outline has a radius of curvature selected from the range of 2.5-50 mm, such as from the range of 5-30 mm, especially from the range of 6-20 mm, such as from the range of 7-10 mm. In further embodiments, the radius of curvature may be at least 1 mm, especially at least 2 mm, such as at least 2.5 mm, especially at least 3 mm, such as at least 4 mm, especially at least 5 mm, such as at least 6 mm, especially at least 7 mm. In further embodiments, the radius of curvature may be at most 60 mm, such as at most 50 mm, especially at most 40 mm, such as at most 30 mm, especially at most 20 mm, such as at most 10 mm.

In particular, if the cross-section is selected parallel to the longitudinal axis of the sonotrode and perpendicular to a width W of the sonotrode, the outline may correspond to the circular arc of the circular sector.

Especially, over the entire width W the central radius $r_c$, which may especially be selected from the range of 5-30 mm, is constant within 5% of an average value, especially within 2% of an average value, such as within 1% of an average value. Hence, especially cross-sectional shapes perpendicular to the width and parallel to the longitudinal axis A may essentially be identical over at least 90%, even more especially at least 95%, yet even more especially at least 99% of the width of the welding section.

Further, the circular sector has a central radius $r_c$. In embodiments there may be some tolerance from a pure circle, such as up to about +/−5%, such as +/−2%, like +/−1%, relative to the value of the central radius $r_c$. However, as indicated above, cross-sectional shapes perpendicular to the width and parallel to the longitudinal axis A may essentially be identical over at least 90%, even more especially at least 95%, yet even more especially at least 99% of the width of the welding section.

In further embodiments, the welding section may define the circular sector in a cross-section parallel to a longitudinal axis of the sonotrode, i.e., the rounded shape is the circular sector.

Similarly, in embodiments, the welding section may have the shape of a cylindrical sector, especially the semi-cylindrical shape.

In embodiments, the sonotrode comprises a sonotrode material selected from the group comprising metals and alloys, especially from the group comprising stainless steel, titanium, and aluminum.

Especially, the sonotrode is a single body, even more especially from metal or a metal alloy.

Sonotrodes, especially relatively large sonotrodes, may be slotted to reduce stress due to horizontal vibrations. Hence, in embodiments, the sonotrode may be a slotted sonotrode. Hence, in embodiments, the sonotrode may comprise one or more through-holes.

In further embodiments, the sonotrode may be an unslotted sonotrode. Hence, in embodiments, the sonotrode may be devoid of through-holes.

In embodiments, the sonotrode has a length L. The length L may e.g. be selected from the range of 15-600 mm, such as from the range of 20-500 mm, especially from the range of 30-300 mm, such as from the range of 40-200 mm.

Especially, in embodiments the sonotrode comprises a first part, a second part, and the welding section. The length L is defined by the first part, the second part, and the welding section. Yet further, the second part may be configured between the first part and the welding section. As indicated above, the first part, the second part, and the welding section may be a single body, especially of metal or metal alloy. The second part has a (second part) thickness T and a second part width WL. Further, the welding section tapers from the second part to a welding section top. Hence, there may be an essentially stepless change from second part to welding section to the welding section top. Hence, the largest width of the welding section and the largest thickness of the welding section are in embodiments identical to the thickness and the width of the second part. Especially, the (second part) thickness T and the second part width WL are constant over at least 40% of the length L of the sonotrode, such as at least 50%. Further, in specific embodiments WL=W. Further, especially good results may be obtained when $r_c<W\le 4*r_c$, such as $1.5*r_c<W\le 4*r_c$.

The first part may have a width larger than the second part width. Further, the first part may have a thickness larger than the second part. Especially, this width and thickness are gradually achieved. In other words, the first part tapers to its maximum width and thickness. In this way, there may be an essentially stepless change from the second part to the maximum width and thickness parts of the first part.

In a further aspect, the invention may provide a method for welding a material using the sonotrode according to the invention. The method may comprise arranging the sonotrode on the material, especially arranging the contact interface on the material. The method may further comprise providing ultrasonic vibrations with the sonotrode.

In embodiments, the method may comprise applying a pressure to the material (with the sonotrode), especially based on the imprint area of the sonotrode with (upper) adherends, wherein the pressure is at least 10 MPa, such as at least 15 MPa, especially at least 17 MPa, such as at least 20 MPa, especially at least 25 MPa, such as at least 30 MPa. In further embodiments, the pressure may be at most 120 MPa, such as at most 100 MPa, especially at most 80 MPa, such as at most 60 MPa, especially at most 50 MPa. By increasing the pressure, the occurrence of voids may be reduced. However, by increasing the pressure, the occurrence of material distortion may be increased. Hence, the pressure may be selected to balance the occurrence of voids and material distortion. In particular, the method may work particularly well with a pressure selected from the range of 10 MPa to 100 MPa, especially with a pressure selected from the range of 15 MPa to 100 MPa.

As the sonotrode comprises a rounded contact interface, it may (essentially) provide a line contact with the material. Therefore, the sonotrode may facilitate determining suitable welding parameters, such as a suitable, especially optimal, welding speed for a fixed welding force and vibrational peak-to-peak amplitude. In particular, in such example, the suitable welding speed can be found by varying the speed along a welding line and observing when the material at the interface is fully molten. Then the optimum welding speed can be found the moment all material at the interface is visibly molten upon separation of the two components welded together. This approach may be essentially incompatible with prior art sonotrodes as the contacting area and the heat affected zone are rather large.

Hence, in embodiments, the method may comprise determining a suitable welding parameter range (of a welding parameter, such as a welding speed for a set welding force and vibrational peak-to-peak amplitude), especially a suitable welding parameter value, for welding the material with the sonotrode of the invention, wherein the method comprises moving the sonotrode along a welding line, and wherein the method comprises varying the welding parameter along the welding line, especially varying the welding parameter according to a gradient. In further embodiments, the method may comprise analyzing the (welded) material at the welding line to determine a suitable welding parameter range.

The invention may also provide the method for determining the suitable welding parameter range as such.

In embodiments, the sonotrode may be functionally coupled to a consolidator. The consolidator may be configured to pass over the material after the sonotrode. Hence, the consolidator may be arranged downstream of the sonotrode (with respect to a point along a welding line).

A consolidator may be arranged downstream of the sonotrode such that the material cools down, preferably below the glass transition temperature, while remaining under (sufficient) pressure. It will be clear to the person skilled in the art that the pressure provided by the consolidator may be lower than the pressure (previously) applied by the sonotrode; the person skilled in the art will be capable of selecting a suitable pressure. For the sonotrode of the invention, it may be particularly beneficial to place the consolidator close to the sonotrode (also see experiments below).

Hence, in further embodiments, the sonotrode and the consolidator may (during operation) be separated by a distance $d_1$ (measured between closest contact points along the material), wherein $d_1 \leq 10$ cm, such as $\leq 8$ cm, especially $\leq 5$ cm, such as $\leq 4$ cm, especially $\leq 3$ cm, such as $\leq 2$ cm, especially $\leq 1$ cm. In particular, for the sonotrode of the invention, it may be beneficial to place the consolidator as close as possible to the sonotrode. In practice, there may, however, generally be a (small) gap between the sonotrode and the consolidator.

In embodiments, the consolidator may comprise a consolidator wheel. Thereby, the consolidator may also be particularly suitable for the welding of a curved material, such as a curved panel.

In further embodiments, the consolidator may further comprise or be functionally coupled to a stabilization wheel, wherein the stabilization wheel is arranged at the opposite side of the sonotrode with respect to the consolidator wheel. Hence, the stabilization wheel may be arranged upstream of the sonotrode. In particular, the stabilization wheel may counterbalance the moment created from the consolidation force, as described in U.S. Pat. No. 7,896,994B2, which is hereby herein incorporated by reference. Such embodiments may be particularly beneficial with respect to robotized welding.

In embodiments, the material may comprise a panel. In particular, the material may comprise a curved panel.

In further embodiments, the material, especially the curved panel, may have a radius of curvature $r_{mc}$, especially wherein $r_{mc} \geq 0.05$ m, especially $r_{mc} \geq 0.1$ m, such as $r_{mc} \geq 0.5$ m, especially $r_{mc} \geq 1$ m, such as $r_{mc} \geq 2$ m. In further embodiments, $r_{mc} \leq 20$ m, such as $r_{mc} \leq 15$ m, especially $r_{mc} \leq 10$ m, such as $r_{mc} \leq 5$ m, especially $r_{mc} \leq 2$ m, In particular, the method may comprise moving the sonotrode over a welding line, wherein at least part of the welding line has a radius of curvature $r_{mc}$, especially wherein $r_{mc} \geq 0.05$ m, especially $r_{mc} \geq 0.1$ m, such as $r_{mc} \geq 0.5$ m, especially $r_{mc} \geq 1$ m, such as $r_{mc} \geq 2$ m. In further embodiments, $r_{mc} \leq 20$ m, such as $r_{mc} \leq 15$ m, especially $r_{mc} \leq 10$ m, such as $r_{mc} \leq 5$ m, especially $r_{mc} \leq 2$ m. As will be clear to the person skilled in the art, the phrase "wherein at least part of the welding line has a radius of curvature" refers to at least part of the welding line being arranged along a section of the material, wherein the section of the material has the radius of curvature along the welding line.

In further embodiments, the material may comprise a thermoplastic composite, especially a thermoplastic composite laminate. In further embodiments, the material may comprise an aerospace material, i.e., a material used to provide an aircraft. In further embodiments, the material may comprise an automotive material, i.e., material used to provide an (automotive) vehicle.

In a further aspect, the invention may provide a use of the sonotrode according to the invention to weld a material. In embodiments, the material may comprise a curved panel.

In further embodiments, the material may comprise a thermoplastic composite, especially a thermoplastic composite laminate. In further embodiments, the material may comprise a thermoset. In further embodiments, the material may comprise an aerospace material or an automotive material, especially an aerospace material, or especially an automotive material.

In yet a further aspect, the invention also provides a welded material obtainable with the method as described herein. Especially, in embodiments the welded material is a curved panel. Hence, in specific embodiments the invention provides a curved panel of thermoplastic composite laminate.

In yet a further aspect, the invention also provides a sonotrode welding device comprising the sonotrode as defined herein. With such device, e.g. the above described method may be applied.

BRIEF DESCRIPTION OF THE DRAWINGS

Embodiments of the invention will now be described, by way of example only, with reference to the accompanying schematic drawings in which corresponding reference symbols indicate corresponding parts, and in which.

DETAILED DESCRIPTION OF THE EMBODIMENTS

Figure 1A:
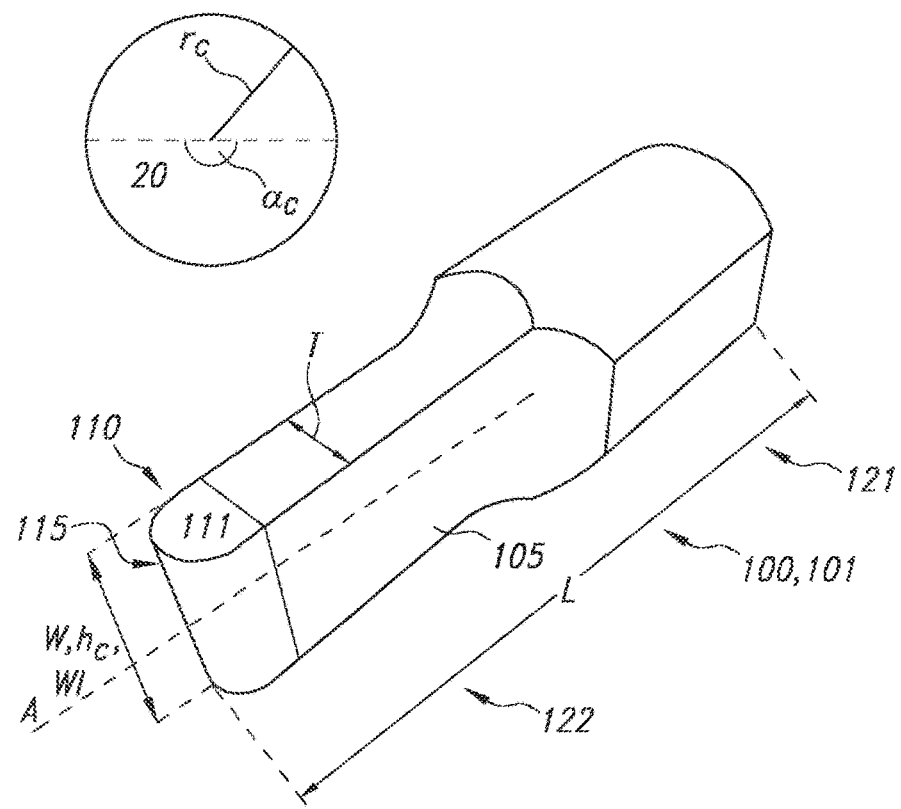
FIG. 1A-D schematically depict embodiments of the sonotrode.

FIG. 1A-D schematically depict embodiments of the sonotrode 100 for welding a material 10. The sonotrode 100 comprises a welding section 110 configured for contacting the material 10. In particular, the welding section 110 defines a rounded shape 111 in a cross-section parallel to a longitudinal axis A of the sonotrode 100. The rounded shape 111 may approximate a circular sector 20. In embodiments, the circular sector 20 may have a central angle $\alpha_c$ selected from the range of 135°-210°. In the depicted embodiment, the central angle $\alpha_c$ may be about 180°. In further embodiments, the circular sector 20 may have a central radius $r_c$ selected from the range of 5-30 mm, especially from the range of 7-15 mm. In embodiments, The sonotrode 100 may have a width W perpendicular to the longitudinal axis A (and to the cross-section), especially wherein W is selected from the range of 10-100 mm, especially from the range of 20-60 mm.

In the depicted embodiment, the welding section 110 (further) has a welding shape approximating a semi-cylindrical shape. In particular, the semi-cylindrical shape has a cylinder height perpendicular to a longitudinal dimension of the sonotrode, especially wherein the cylinder height is selected from the range of 10-100 mm. In particular, the cylinder height $h_c$ may be identical to the width W of the sonotrode. Further, the semi-cylindrical shape may have a cylinder radius selected from the range of 5-30 mm. In particular, the cylinder radius may be identical to the central radius $r_c$.

FIG. 1A further schematically depicts an embodiment wherein the sonotrode is an unslotted sonotrode 101.

In embodiments, the sonotrode 100 may comprise a sonotrode material 105 selected from the group comprising stainless steel, titanium, and aluminum.

In particular, in the depicted embodiment, the sonotrode 100, especially the welding section 110, may define the circular sector 20.

In the depicted embodiments, the welding section 110 defines an outline 112, especially wherein at least part of the outline 112 has a radius of curvature selected from the range of 5-30 mm. The outline 112 may especially coincide with a circular arc defined by the circular sector 20.

In the depicted embodiment, the sonotrode has a thickness T perpendicular to the longitudinal axis A and the width W, wherein the thickness may vary along the longitudinal axis and/or the width W, especially along the longitudinal axis. In particular, the thickness T may, in the depicted embodiment, have a constant value along approximately 40% of the sonotrode along the longitudinal axis. In particular, the constant value for this thickness T is equal to twice the radius $r_c$ of the circular sector.

In further embodiments, the thickness T may have a constant value along at least 10% of the sonotrode along the longitudinal axis, such as along at least 20%, especially along at least 30%, such as along at least 40%, especially along at least 50%.

In particular, in embodiments the sonotrode 100 may comprise a first part 121, a second part 122, and the welding section 110. The length L may be defined by the first part 121, the second part 122, and the welding section 110. Yet further, the second part 122 may be configured between the first part 121 and the welding section 110. As indicated above, the first part 121, the second part 122, and the welding section 110 may be a single body, especially of metal or metal alloy. The second part 122 may have a second part thickness T and a second part width WL. Further, the welding section 110 tapers from the second part 122 to a welding section top 115. Hence, there may be an essentially stepless change from second part to welding section to the welding section top 115. Hence, the largest width of the welding section and the largest thickness of the welding section are in embodiments identical to the thickness and the width of the second part. Especially, the second part thickness T and the second part width WL may be constant over at least 40% of the length L of the sonotrode 100, such as at least 50%. Further, in specific embodiments WL=W. Further, especially good results may be obtained when $r_c < WL \leq 4*r_c$, such as $1.5*r_c < W \leq 4*r_c$.

The first part may have a width larger than the second part width. Further, the first part may have a thickness larger than the second part. Especially, this width and thickness are gradually achieved. In other words, the first part tapers to its maximum width and thickness. In this way, there may be an essentially stepless change from the second part to the maximum width and thickness parts of the first part.

Figures 1B, 1C:
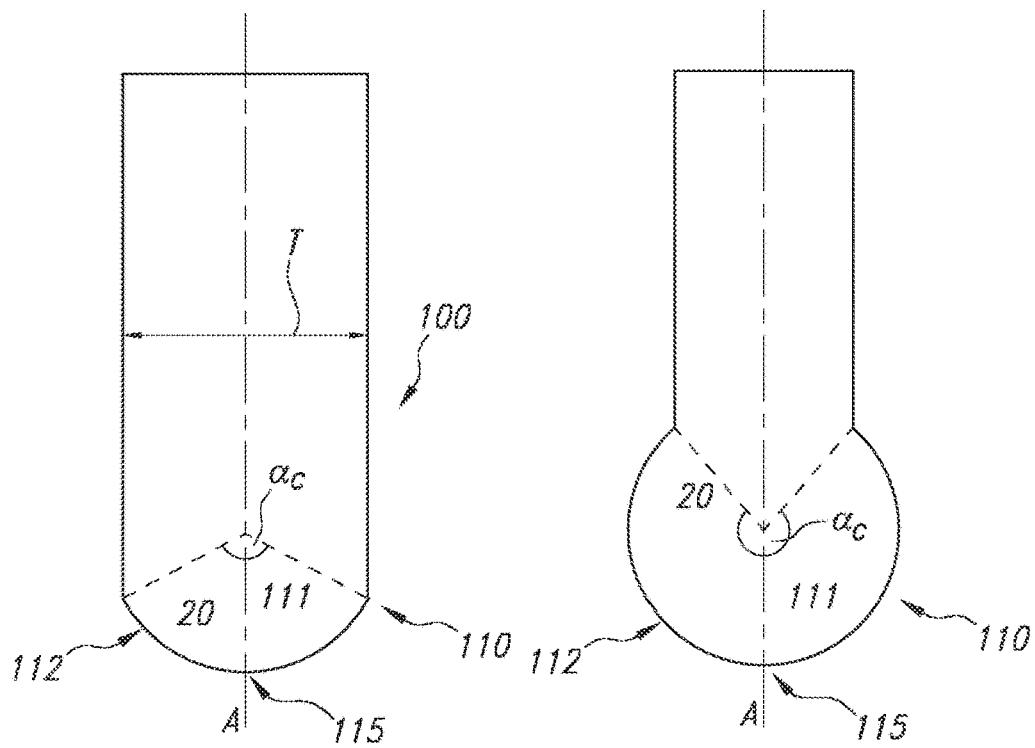

FIG. 1B schematically depicts an embodiment wherein the central angle $\alpha_c$ may be about 135°. Similarly, FIG. 1C may schematically depict an embodiment wherein the central angle $\alpha_c$ may be about 290°.

Figure 1D:
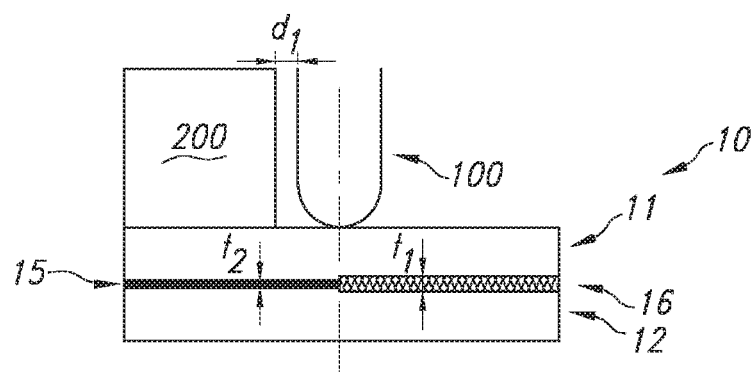

FIG. 1D schematically depicts an embodiment of the sonotrode 100 during operation. In the depicted embodiment, the sonotrode 100 is depicted on a material 10. Further, the sonotrode 100 is functionally coupled to a consolidator 200, wherein the consolidator. Hence, in embodiments, the sonotrode may be (configured for) functionally coupled (coupling) to a consolidator 200.

The material 10 may comprise a first adherend 11 (or "top adherend"), a second adherend 12 (or: "bottom adherend"), and an energy director 16. In particular, the material may further comprise a welding line 15, wherein, during operation, the sonotrode may be moved over the welding line 15 to weld the first adherend and the second adherend to one another.

FIG. 1D further schematically depicts the method for welding a material using a sonotrode 100 according to the invention. The method comprises: arranging the sonotrode 100 on (an upper surface of) the material 10, especially on the welding line 15; and providing ultrasonic vibrations with the sonotrode 100. In particular, the method may comprise exerting mechanical vibrations onto the upper surface of the first adherend 11 and thus indirectly applying mechanical energy to the energy director 16 located at the welding line 15. The method may further comprise moving the sonotrode 100 along the material 10, especially along the welding line 15.

In further embodiments, the sonotrode 100 may be functionally coupled to a consolidator 200, especially wherein the consolidator 200 is arranged downstream from the sonotrode 100 at a distance $d_1$ from the sonotrode 100, especially wherein $d_1 \leq 8$ cm.

In further embodiments, the material 10 may comprise a curved panel.

FIG. 1D further schematically depicts an embodiment of the use of the sonotrode 100 according to the invention to weld a material 10. In embodiments, the material 10 may especially be a curved panel. In further embodiments, the material 10 may comprise a thermoplastic composite laminate. In yet further embodiments, the material 10 may comprise an aerospace material.

In particular, in the depicted embodiment, the sonotrode 100 may, during operation, move towards the right, followed by the consolidator 200 at the distance $d_1$. Hence, the part left of the hyphened line has been exposed to the sonotrode, whereas the part right of the hyphened line has not yet. Hence, the welding line may have a first thickness $t_1$ right of the hyphened line, and a second thickness $t_2$ left of the hyphened line, wherein $t_2 < t_1$. For visualizational purposes, the welding line left of the hyphened line has been depicted thinner; it will be clear to the person skilled in the art, however, that the thickness of the first adherent 11 and of the second adherent 12 essentially does not change due to the sonotrode (application).

Experiments

FIG. 2A-3C relate to experimental observations obtained using a comparative example and the sonotrode of the invention.

Materials

The experiments were performed with thermoplastic composite laminates made out of carbon fiber fabric (five harness satin weave) impregnated with polyphenylene sulfide powder (CF/PPS semipreg), CF 0286 127 Tef4 43% from Toray Advanced Composites, the Netherlands. The laminates were stacked according to a [0/90]$_3$, sequence and consolidated in a hot adherend press for 20 min at 320° C. and 1 MPa pressure. The consolidated laminates had a size of 580 mm by 580 mm, and a thickness of approximately 1.85 mm. Adherends measuring 220 mm by 101.6 mm were cut from the consolidated laminates for the continuous welding experiments. For the adherends the main apparent fiber direction was in the 101.6 mm-direction. A 0.20 mm-thick woven polymer mesh energy director was used for all experiments to focus heat generation at the welding interface. The PPS woven mesh (product name PPS100) was supplied by PVF GmbH, Germany.

Procedure

The experiments were performed with a welding machine that consists of a stiff frame with a X-Y table on a guiding system allowing automatic translation in its x direction and an off-the-shelf ultrasonic welder from Herrmann Ultrasonics of the type VE20 SLIMLINE DIALOG 6200. The ultrasonic welder records feedback data (such as time, power consumption, energy, vertical sonotrode displacement, and amplitude) at a 1 kHz frequency. The operating frequency of the welder is 20 kHz. The welding train consisted of the converter, booster and sonotrode.

Two sonotrode types were compared. A comparative 'common' flat surface sonotrode with a contact surface of 15 mm in width, and the sonotrode of the invention. Specifically, the sonotrode of the invention had a rounded contact surface with a radius of 7.5 mm. For both sonotrodes the same peak-to-peak vibrational amplitude of 80 µm was used. For the welds made with the comparative sonotrode a welding force of 500 N was used and for the rounded sonotrode a welding force of 1000 N was used. A copper consolidator block of 40 mm (width) by 30 mm was used, which applied a consolidation force of 800 N, corresponding to a pressure of 1.6 MPa. For the comparative sonotrode three consolidation distances ($d_1$) were used in different experiments: 18.4 mm, 63 mm, and 86.4 mm. For the rounded sonotrode the consolidation distance was 9.5 mm from the middle of the sonotrode, corresponding to 2.5 mm directly from the edge of the sonotrode.

The 220-mm wide adherends were welded together over an overlap width of 12.7 mm. The CF/PPS top and bottom adherends were kept in place by two aluminum bar clamps. A mesh energy director was placed in between the two adherends. In order to consistently ensure a fixed overlap width of 12.7 mm between the two adherends, alignment pins were used. During the welding process the X-Y table moved underneath the sonotrode in X-direction over a welding distance of 205 mm as shown in FIG. 1, while the sonotrode applied the static welding force and the high-frequency vibrations.

To visualize void formation, void closure and squeeze flow for the comparative sonotrode during the continuous welding process the welding process was stopped prematurely (before welding the entire overlap), and cross-sectional micrographs were cut from different locations of the overlap and analyzed using a microscope. In other words, the movement of the table was stopped, the sonotrode was retracked and the comparative consolidator remained stationary applying a consolidation pressure. This made it possible to cut cross-sectional micrographs from different phases of the welding process: the presence of voids and the squeeze flow in between the sonotrode and the consolidator (no consolidation yet), directly under the consolidator (consolidating), and behind the consolidator (underwent consolidation). For the sonotrode of the invention the void formation and squeeze was visualized by welding with and without a consolidator since the consolidator had to be placed close to the sonotrode.

Five evenly spaced thermocouples were placed along the overlap. Specifically, the thermocouples were spaced with 40 mm between adjacent thermocouples, and the outer two thermocouples were spaced 30 mm from the edge of the adherend. The same welded adherends were used for a single lap shear test. The thermocouples were placed in between the bottom adherend and energy director. The temperature at the weld interface was measured using K-type thermocouples supplied by Tempco (product number 2-2200-0004 and description GG220-2K-0). An analog output K-type thermocouple amplifier was used from Adafruit with product number AD8495 sampling the temperature at 1 kHz. The thermocouples had a wire diameter of 0.10 mm. A 25 moving average filter was applied to the measured temperature data in order to filter out small high frequency fluctuations.

Figure 2A:
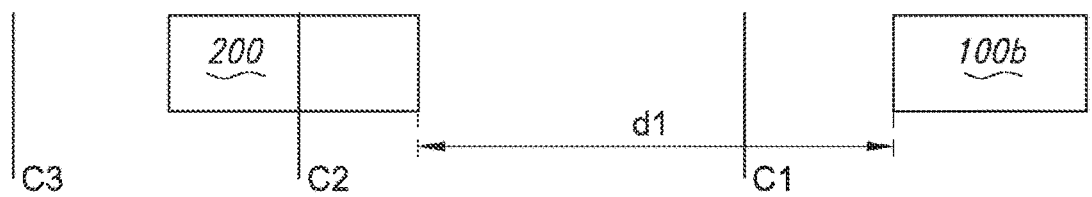
FIG. 2A-B schematically depict experimental data obtained with a comparative example of the method.
Figure 2A:
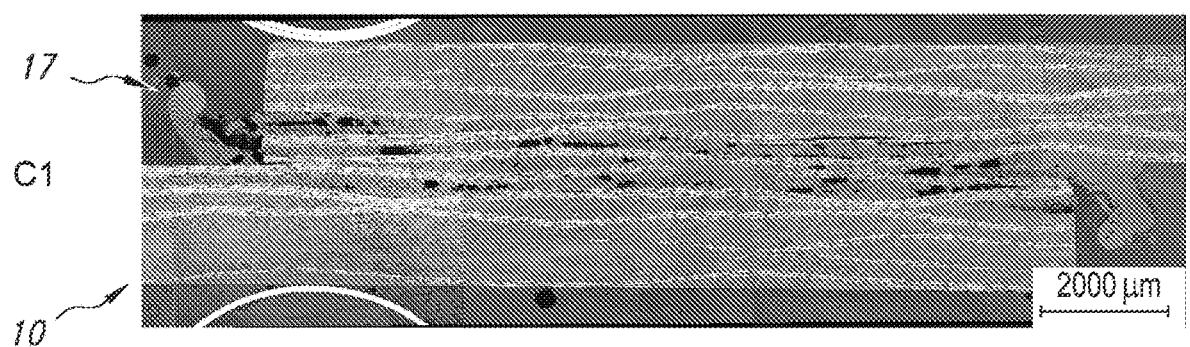
Figure 2A:
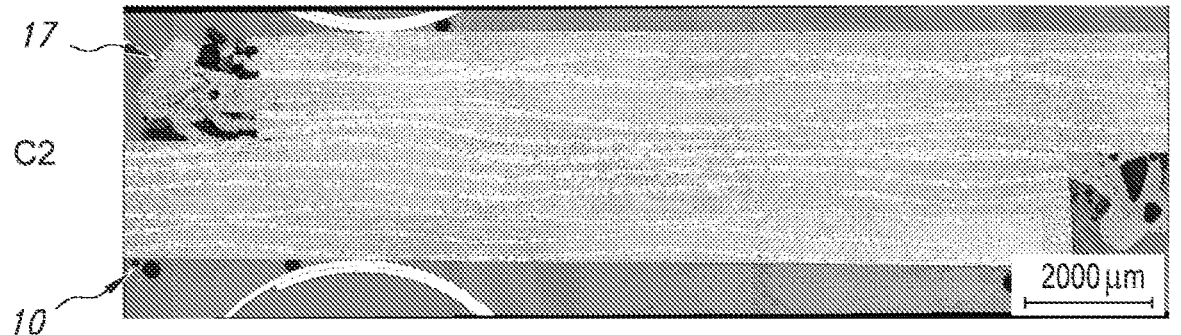
Figure 2A:
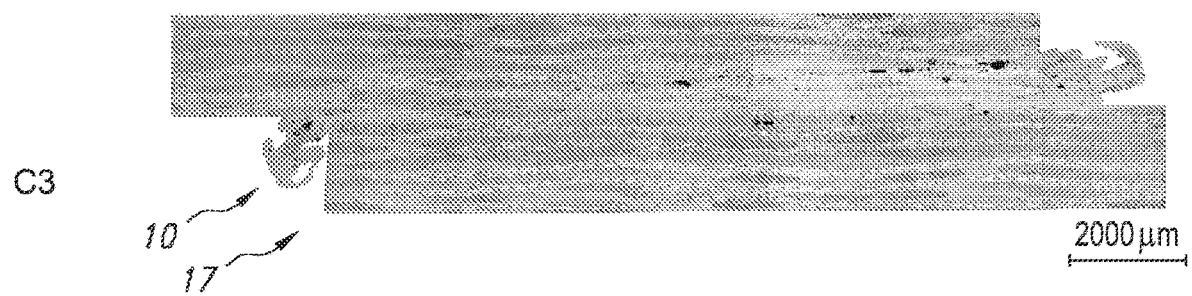
Figure 2B:
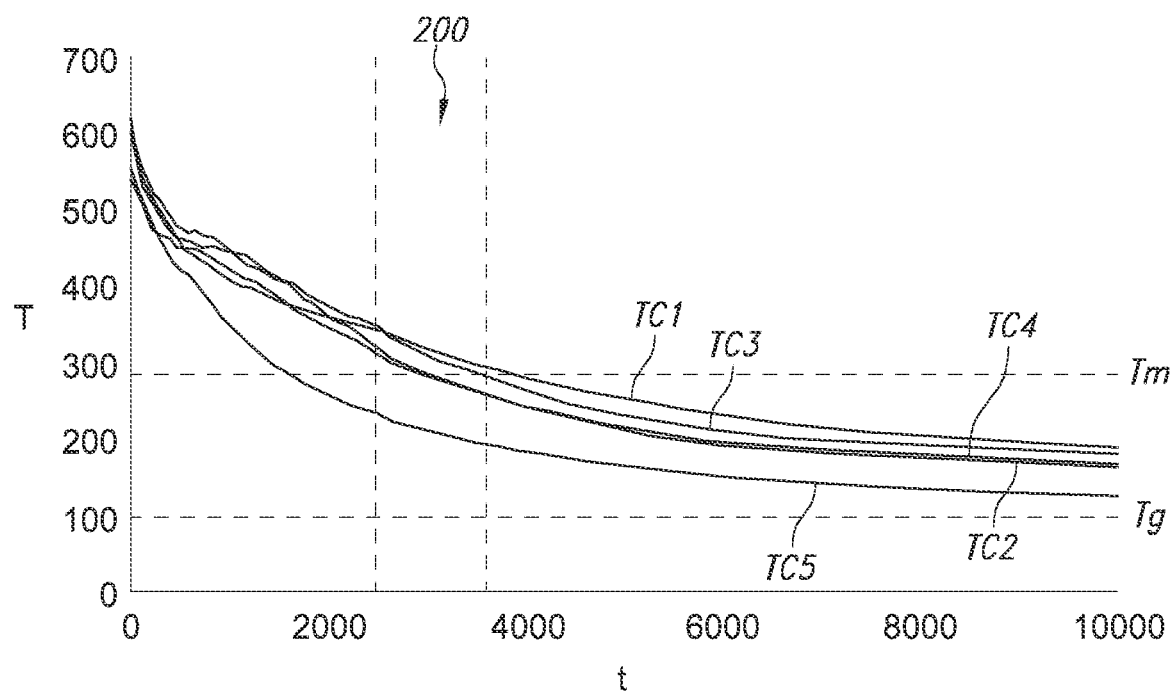

FIG. 2A-B schematically depict the experimental observations obtained using the comparative example.

The experiments have been performed with a comparative sonotrode 100b either without a functionally coupled consolidator 200, or with functionally coupled consolidators 200 arranged at distances of 18.4 mm, 63 mm, or 86.4 mm from the comparative sonotrode 100b. The experiments performed with a consolidator 200 outperformed those without a consolidator 200, and the larger the distance between the consolidator 200 and the comparative sonotrode 100b the better the observed results were, i.e., the experiments with the consolidator 200 arranged at a distance of 86.4 mm from the comparative sonotrode 100b outperformed those wherein the distance was 63 mm, which outperformed those where the distance was 18.4 mm.

FIG. 2A schematically depicts the experimental setup, wherein the comparative sonotrode 10b is functionally coupled to a consolidator 200 at a distance $d_1$, wherein $d_1$ is 86.4 mm. Hence, the comparative sonotrode 100b and the consolidator 200 move along the material 10 together, wherein the comparative sonotrode 100b moves over (any section of) the material first, and wherein the consolidator 200 follows. In particular, the comparative sonotrode 100b (and the consolidator) was moved at a welding speed of 35 mm/s, with a vibrational peak-to-peak amplitude of 80 µm, and at a welding force of 500 N (Pressure=2.6 MPa), and a consolidation pressure of 1.6 MPa.

FIG. 2A further depicts three cross-sections of the material 10 as the material was being welded. In particular, the welding was stopped and cross-sections of the material 10 were made based on predefined positions. The first cross-section $C_1$ is arranged between the comparative sonotrode 100b and the consolidator 200, i.e., the consolidator 200 has not yet passed over the first cross-section $C_1$. The second cross-section $C_2$ is arranged such that half of the consolidator has passed over the second cross-section $C_2$ and kept on the cross-section until the weld interface cooled down below Tg. The third cross-section is arranged such that the consolidator 200 has fully passed over the third cross-section $C_3$. Further, each of the cross-sections depicts substantial material distortion 17. In particular, fiber may be squeezed out of the material 10, especially at the edges, which may be detrimental to the material properties.

FIG. 2A further schematically depicts the material 10 at the three cross-sections. As may be appreciated by the person skilled in the art, at cross-section $C_1$ there is a large degree of voids. In particular, in cross-section C1 a large degree of deconsolidation voids can be seen within both adherends. These voids are detrimental for the quality of the material as they significantly lower the strength of the joint. Additionally, a significant fiber and resin squeeze out can be observed from the two edges. This effect damages the adherends and the squeeze flow might introduce extra voids within the adherends. At cross-section $C_2$, there is a low degree of voids. At cross section $C_3$ deconsolidation voids can still be observed and a significant fiber squeeze out is present. Hence, although the consolidator improves the weld (compare $C_3$ to $C_1$), a substantial amount of voids remain, and substantial fiber/resin squeeze out is observed at each cross-section.

FIG. 2B further schematically depicts the temperature T (in ° C.) of a specific spot of the material 10 over time t (in ms), wherein t=0 corresponds to the moment where the specific spot is no longer in direct contact with the sonotrode. Each line corresponds to a different thermocouple, wherein along the welding path TC2 is downstream of TC1, TC3 is downstream of TC2, TC4 is downstream of TC3, and TC5 is downstream of TC4. The column indicates when the consolidator 200 (with $d_1$=86.4 mm) is present on the specific spot of the material.

Ideally, the consolidator may be applied to the material 10 as it cools down from below the glass transition temperature $T_g$. However, this would require an impractically large consolidator 200 with the comparative sonotrode 100b.

Further, it has been observed that the welded material obtained with the comparative sonotrode may fail in a single lap shear test at an off-set from the welding line. This may be indicative of damage to the adherends close to the welding line, due to, for example, excessive heat exposure, material distortion and/or voids within the adherends.

Figure 3A:
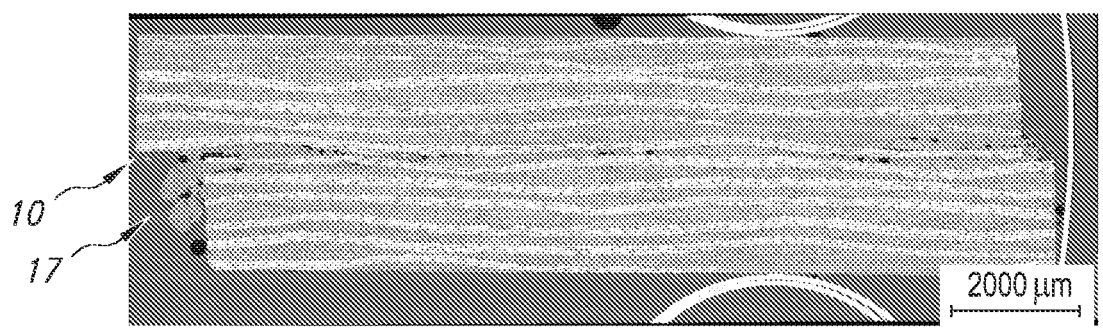
FIG. 3A-C schematically depict experimental data obtained with embodiments of the sonotrode and the method. The schematic drawings are not necessarily on scale.
Figure 3A:
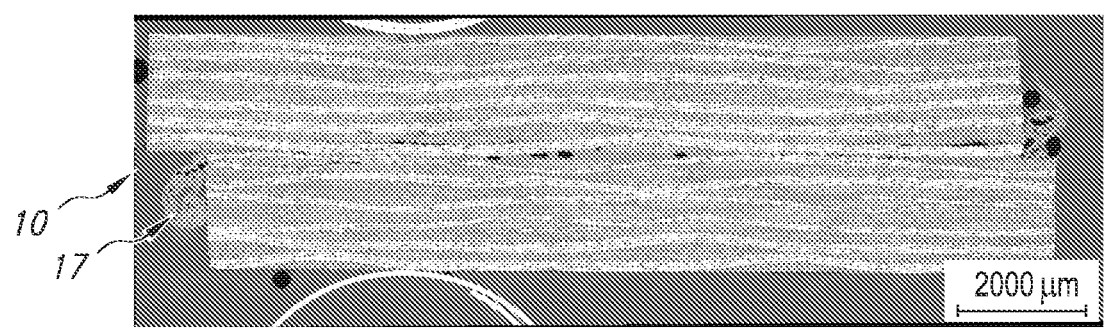
Figure 3B:
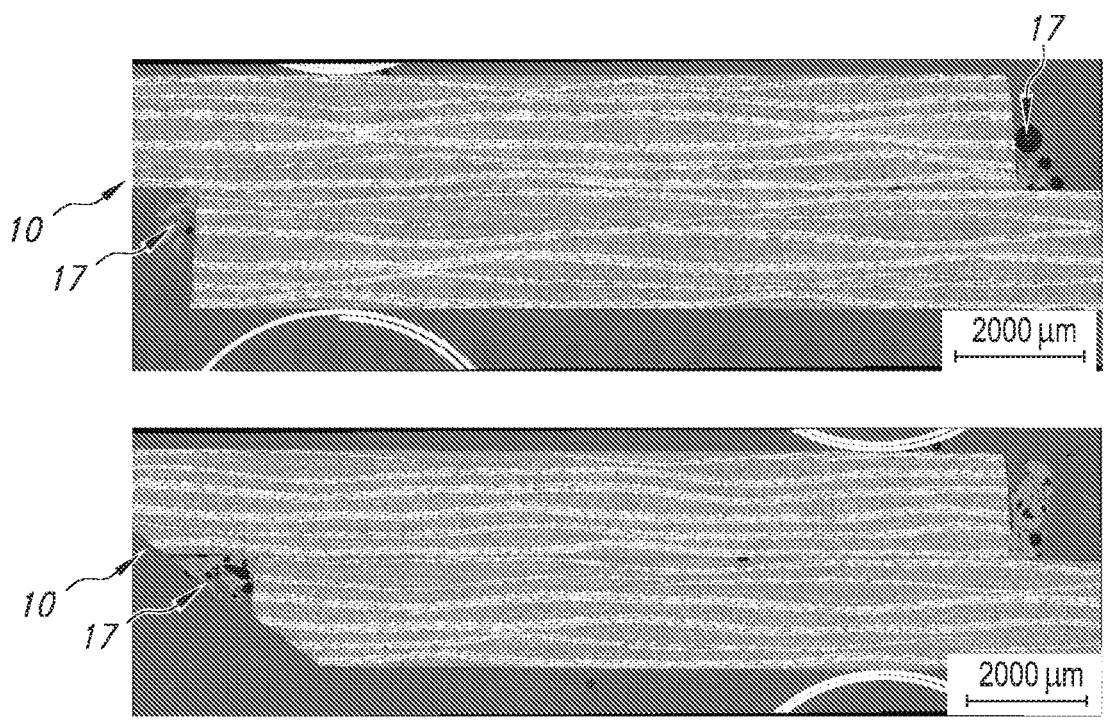
Figure 3C:
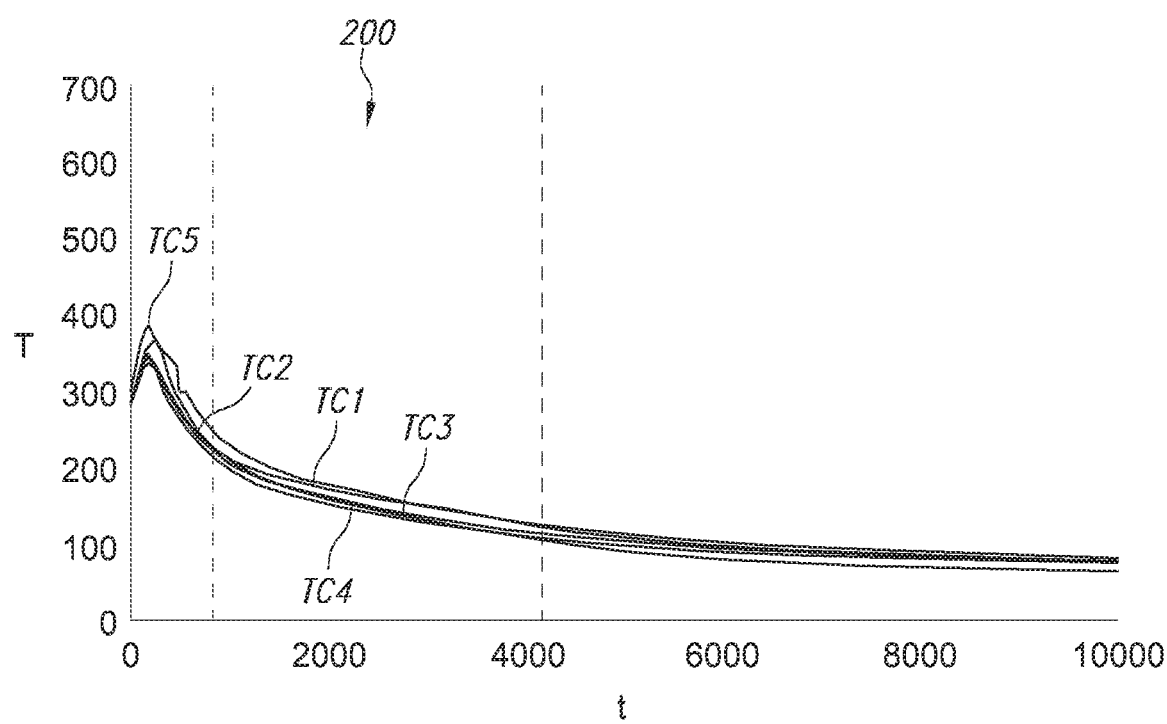

FIG. 3A-C schematically depict experimental observations obtained with embodiments of the method and the sonotrode 100.

In particular, FIG. 3A schematically depicts experimental observations obtained after welding the material 10 with an embodiment of the sonotrode 100 without a consolidator 200. In particular, the sonotrode 100 was moved over the material 10 at a welding speed of 12 mm/s, with a vibrational peak-to-peak amplitude of 80 μm, and at a welding force of 1000 N (Pressure=52 MPa; based on an 1.5 mm by 12.7 mm area of the imprint of the sonotrode with the top adherend). After welding, the material 10 shows a low number of voids and relatively little material distortion 17, especially no fiber squeeze out.

Hence, the sonotrode according to the invention may facilitate acquiring improved welds. In particular, even without using a consolidator, the welded material obtained with the sonotrode of the invention shows less material distortion than the welded material obtained with the comparative sonotrode 100 functionally coupled to the consolidator (see $C_3$ in FIG. 2A).

FIG. 3B schematically depicts experimental observations obtained after welding the material 10 with the sonotrode 100 functionally coupled to a consolidator 200, wherein the consolidator 200 is arranged at a distance $d_1$ of 2.5 mm from the sonotrode. In particular, the sonotrode 100 was moved over the material 10 at a welding speed of 12 mm/s, with a vibrational peak-to-peak amplitude of 80 μm, and at a welding force of 1000 N (Pressure=52 MPa). After welding, the material 10 shows a minute number of voids and no adherend material distortion 17.

Hence, the sonotrode of the invention coupled to a consolidator, specially wherein the consolidator is arranged in close proximity to the sonotrode, may provide higher quality welds than the comparative sonotrode functionally coupled to a consolidator.

FIG. 3C further schematically depicts the temperature T (in ° C.) of a specific spot of the material 10 over time t (in ms), wherein t=0 corresponds to the moment where the specific spot is in direct contact with the center of the welding section 110. Each line corresponds to a different thermocouple. The column indicates when the consolidator 200 is present on the specific spot of the material. Note that, in comparison to FIG. 2B the consolidator appears broader, which is due to the lower welding speed Hence, as the use of the sonotrode 100 of the invention may result in less heat being provided to the material 10 close to the welding line, the material 10 may cool down faster, and the consolidator may be applied as the material 10 cools down (slightly) above the glass transition temperature $T_g$.

Experiments performed with a sonotrode of the invention having a central angle $α_c$, of 44° and a radius of 17.5 mm gave comparable results. Specifically, the welding was performed with a welding force of 1000 N, a peak-to-peak amplitude of 80 and 15 mm/s with 1.6 MPa of consolidation. Almost no voids could be distinguished from cross-sections and fracture surfaces. A lap shear strength of 34.3±2.6 MPa (n=5) was obtained.

The term "plurality" refers to two or more. Furthermore, the terms "a plurality of" and "a number of" may be used interchangeably.

The terms "substantially" or "essentially" herein, and similar terms, will be understood by the person skilled in the art. The terms "substantially" or "essentially" may also include embodiments with "entirely", "completely", "all", etc. Hence, in embodiments the adjective substantially or essentially may also be removed. Where applicable, the term "substantially" or the term "essentially" may also relate to 90% or higher, such as 95% or higher, especially 99% or higher, even more especially 99.5% or higher, including 100%. Moreover, the terms "about" and "approximately" may also relate to 90% or higher, such as 95% or higher, especially 99% or higher, even more especially 99.5% or higher, including 100%. For numerical values it is to be understood that the terms "substantially", "essentially", "about", and "approximately" may also relate to the range of 90%-110%, such as 95%-105%, especially 99%-101% of the values(s) it refers to.

The term "comprise" includes also embodiments wherein the term "comprises" means "consists of".

The term "and/or" especially relates to one or more of the items mentioned before and after "and/or". For instance, a phrase "item 1 and/or item 2" and similar phrases may relate to one or more of item 1 and item 2. The term "comprising" may in an embodiment refer to "consisting of" but may in another embodiment also refer to "containing at least the defined species and optionally one or more other species".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices, apparatus, or systems may herein amongst others be described during operation. As will be clear to the person skilled in the art, the invention is not limited to methods of operation, or devices, apparatus, or systems in operation.

The term "further embodiment" and similar terms may refer to an embodiment comprising the features of the previously discussed embodiment, but may also refer to an alternative embodiment.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim.

Use of the verb "to comprise" and its conjugations does not exclude the presence of elements or steps other than those stated in a claim. Unless the context clearly requires otherwise, throughout the description and the claims, the words "comprise", "comprising", "include", "including", "contain", "containing" and the like are to be construed in an inclusive sense as opposed to an exclusive or exhaustive sense; that is to say, in the sense of "including, but not limited to".

The article "a" or "an" preceding an element does not exclude the presence of a plurality of such elements.

The invention may be implemented by means of hardware comprising several distinct elements, and by means of a suitably programmed computer. In a device claim, or an apparatus claim, or a system claim, enumerating several means, several of these means may be embodied by one and the same item of hardware. The mere fact that certain measures are recited in mutually different dependent claims does not indicate that a combination of these measures cannot be used to advantage.

The invention also provides a control system that may control the device, apparatus, or system, or that may execute the herein described method or process. Yet further, the invention also provides a computer program product, when running on a computer which is functionally coupled to or comprised by the device, apparatus, or system, controls one or more controllable elements of such device, apparatus, or system.

The invention further applies to a device, apparatus, or system comprising one or more of the characterizing features described in the description and/or shown in the attached drawings. The invention further pertains to a method or process comprising one or more of the characterizing features described in the description and/or shown in the attached drawings. Moreover, if a method or an embodiment of the method is described being executed in a device, apparatus, or system, it will be understood that the device, apparatus, or system is suitable for or configured for (executing) the method or the embodiment of the method respectively.

The various aspects discussed in this patent can be combined in order to provide additional advantages. Further, the person skilled in the art will understand that embodiments can be combined, and that also more than two embodiments can be combined. Furthermore, some of the features can form the basis for one or more divisional applications.

The invention claimed is:

1. A sonotrode (100) for welding a material (10), the sonotrode (100) comprising a welding section (110) configured for contacting the material (10), wherein the welding section (110) defines a rounded shape (111) in a cross-section parallel to a longitudinal axis (A) of the sonotrode (100), wherein the rounded shape (111) approximates a circular sector (20), wherein the circular sector (20) has a central angle $\alpha_c$ selected from the range of 25°-300°, and wherein the circular sector (20) has a central radius $r_c$ selected from the range of 5-30 mm, wherein the sonotrode (100) has a width W perpendicular to the longitudinal axis (A), wherein W is selected from the range of 10-100 mm, and wherein the sonotrode is functionally coupled to a consolidator (200), wherein the consolidator (200) is arranged downstream from the sonotrode (100) at a distance $d_1$ from the sonotrode (100), wherein $d_1 \leq 5$ cm.

2. The sonotrode (100) according to claim 1, wherein in a cross-section the welding section (110) defines an outline (112), wherein at least part of the outline (112) has a radius of curvature selected from the range of 5-30 mm.

3. The sonotrode (100) according to claim 1, wherein the welding section (110) has a welding shape approximating a semi-cylindrical shape, wherein the semi-cylindrical shape has a cylinder height $h_c$ perpendicular to a longitudinal dimension of the sonotrode (100), wherein the cylinder height $h_c$ is selected from the range of 10-100 mm, and wherein the semi-cylindrical shape has a cylinder radius $r_c$ selected from the range of 5-30 mm, wherein $h_c > r$.

4. The sonotrode (100) according to claim 1, wherein the welding section (110) defines the circular sector (20).

5. The sonotrode (100) according to claim 1, wherein the width W is selected from the range of 20-60 mm.

6. The sonotrode (100) according to claim 1, wherein the central radius $r_c$ is selected from the range of 7-15 mm.

7. The sonotrode (100) according to claim 1, wherein the sonotrode (100) comprises a sonotrode material (105) selected from the group comprising stainless steel, titanium, and aluminum.

8. The sonotrode (100) according to claim 1, having a length (L), wherein the sonotrode (100) comprises a first part (121), a second part (122), and the welding section (110), wherein the length (L) is defined by the first part (121), the second part (122), and the welding section (110), wherein the second part (122) is configured between the first part (121) and the welding section (110), wherein the second part (122) has a thickness (T) and a second part width (WL), wherein the welding section (110) tapers from the second part (122) to a welding section top (115), wherein the thickness (T) and the second part width (WL) are constant over at least 40% of the length (L) of the sonotrode (100), wherein WL=W, and wherein $r_c < W \leq 4*r_c$.

9. The sonotrode (100) according to claim 1, wherein the sonotrode (100) is an unslotted sonotrode (101).

10. The sonotrode (100) according to claim 1, wherein the central angle $\alpha_c$ is selected from the range of 40°-300°.

11. The sonotrode (100) according to claim 1, wherein the central angle $\alpha_c$ is selected from the range of 100°-300°.

12. A sonotrode welding device comprising the sonotrode (100) and the consolidator according to claim 1.

13. The sonotrode welding device according to claim 12, wherein the consolidator comprises a block with a contact surface configured for contacting the material (10).

14. The sonotrode (100) according to claim 1, wherein $d_1$=2.5 mm.

15. A method for welding a material using a sonotrode (100), wherein the method comprises:
(i arranging the sonotrode (100) on the material (10); and
(ii) providing ultrasonic vibrations with the sonotrode (100),
wherein the sonotrode (100) comprises a welding section (110) configured for contacting the material (10), wherein the welding section (110) defines a rounded shape (111) in a cross-section parallel to a longitudinal axis (A) of the sonotrode (100), wherein the rounded shape (111) approximates a circular sector (20), wherein the circular sector (20) has a central angle $\alpha_c$ selected from the range of 25°-300°, wherein the circular sector (20) has a central radius $r_c$ selected from the range of 5-30 mm, wherein the sonotrode (100) has a width W perpendicular to the longitudinal axis (A), wherein W is selected from the range of 10-100, and wherein the sonotrode (100) is functionally coupled to a consolidator (200), wherein the consolidator (200) is arranged downstream from the sonotrode (100) at a distance $d_1$ from the sonotrode (100), wherein $d_1 \leq 5$ cm.

16. The method according to claim 15, wherein the material (10) comprises a curved panel, and wherein the material comprises a polymer composite material.

17. The method according to claim 15, wherein the material (10) comprises a curved panel.

18. The method according to claim 15, wherein the material (10) comprises a thermoplastic composite laminate.

19. The method according to claim 18, wherein the material (10) comprises an aerospace material.

20. A sonotrode (100) for welding a fiber-reinforced polymer composite material (10), the sonotrode (100) comprising a welding section (110) configured for contacting the fiber-reinforced polymer composite material (10), wherein the welding section (110) defines a rounded shape (111) in a cross-section parallel to a longitudinal axis (A) of the sonotrode (100), wherein the rounded shape (111) approximates a circular sector (20), wherein the circular sector (20) has a central angle $\alpha_c$ selected from the range of 25°-300°, and wherein the circular sector (20) has a central radius $r_c$ selected from the range of 5-30 mm, wherein the sonotrode (100) has a width W perpendicular to the longitudinal axis (A), wherein W is selected from the range of 10-100 mm, wherein the sonotrode (100) is configured for applying a pressure selected from the range of 15-100 MPa, and wherein the sonotrode is functionally coupled to a consolidator (200), wherein the consolidator (200) is arranged downstream from the sonotrode (100) at a distance $d_1$ from the sonotrode (100), wherein $d_1 \leq 5$ cm.

21. The method according to claim 15, wherein providing ultrasonic vibrations with the sonotrode (100) further comprises applying a pressure to the material with the sonotrode, wherein the pressure is selected from the range of 15 MPa to 100 MPa.

22. The method according to claim 15, wherein the material comprises a fiber-reinforced polymer composite material.

* * * * *